(12) United States Patent
Goto

(10) Patent No.: US 12,732,124 B2
(45) Date of Patent: Sep. 8, 2026

(54) MOTOR CONTROL SYSTEM, MOTOR CONTROL METHOD, AND NON-TRANSITORY STORAGE MEDIUM

(71) Applicant: TOYOTA JIDOSHA KABUSHIKI KAISHA, Toyota (JP)

(72) Inventor: Akihito Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 18/668,449

(22) Filed: May 20, 2024

(65) Prior Publication Data

US 2025/0038688 A1 Jan. 30, 2025

(30) Foreign Application Priority Data

Jul. 24, 2023 (JP) ................................ 2023-120123

(51) Int. Cl.
*H02H 7/08* (2006.01)
*H02P 23/00* (2016.01)
*H02P 23/20* (2016.01)
*H02P 23/28* (2016.01)
*H02P 25/03* (2016.01)

(52) U.S. Cl.
CPC .......... *H02P 23/28* (2016.02); *H02P 23/0022* (2013.01); *H02P 23/0077* (2013.01); *H02P 23/20* (2016.02); *H02P 25/03* (2016.02)

(58) Field of Classification Search
CPC .......... H02P 29/024; H02P 23/28; H02P 3/22; H02P 27/08; H02P 27/06; H02P 29/028
See application file for complete search history.

(56) References Cited

U.S. PATENT DOCUMENTS

2013/0307446 A1 11/2013 Ichikawa
2014/0292231 A1* 10/2014 Kanada .................... H02J 1/10 318/440
2019/0061179 A1 2/2019 Natori et al.
2022/0131494 A1 4/2022 Tan et al.

FOREIGN PATENT DOCUMENTS

JP 5981219 B2 8/2016
JP 2019-058036 A 4/2019
JP 2020-162193 A 10/2020
JP 2022112505 A * 8/2022 ........... H02P 27/085
KR 20150007707 A * 1/2015 ............... H02P 3/02
WO 2017/154303 A1 9/2017

* cited by examiner

*Primary Examiner* — Karen Masih
(74) *Attorney, Agent, or Firm* — Oliff PLC

(57) ABSTRACT

A motor control system includes: an inverter circuit that includes switching elements; an inverter drive circuit configured to switch the switching elements between an on state and an off state; and a power source configured to supply power to the inverter drive circuit. The power source is switched from a first power source to a second power source that is different from the first power source when short-circuit braking is applied to a motor, the first power source being configured to supply power to the inverter circuit.

10 Claims, 8 Drawing Sheets

50
M
U
V
W
110
111
112
R1
P1
P2
Q1
Q2
Q3
Q4
Q5
Q6
INVERTER
DRIVE
CIRCUIT
120
CONTROL
UNIT

50a
M
U
V
W
Q1
Q2
Q3
Q4
Q5
Q6
Q7
Q8
Q9
110
111
112
INVERTER DRIVE CIRCUIT
120
CONTROL UNIT
R1
P1
P2

100
P2
120
CONTROL UNIT
130
SWITCHING UNIT
112
INVERTER DRIVE CIRCUIT
110
111
R1
P1
Q1
Q2
Q3
Q4
Q5
Q6
U
V
W
M

100
M
U
V
W
R1
P1
110
111
Q1
Q2
Q3
Q4
Q5
Q6
112
INVERTER DRIVE CIRCUIT
130
R2
R3
120
CONTROL UNIT
P2

100
P1
R1
110
111
Q1
Q2
Q3
Q4
Q5
Q6
U
V
W
M
112
INVERTER DRIVE CIRCUIT
130
D1
D2
P2
CONTROL UNIT
120

100a
P2
R1
P1
130
SWITCHING UNIT
220
121
SHAFT CONTROL UNIT
112
INVERTER DRIVE CIRCUIT
111
INVERTER CIRCUIT
M
122
MAIN CONTROL UNIT
121
SHAFT CONTROL UNIT
112
INVERTER DRIVE CIRCUIT
111
INVERTER CIRCUIT
M

MOTOR CONTROL SYSTEM, MOTOR CONTROL METHOD, AND NON-TRANSITORY STORAGE MEDIUM

CROSS-REFERENCE TO RELATED APPLICATION

This application claims priority to Japanese Patent Application No. 2023-120123 filed on Jul. 24, 2023, incorporated herein by reference in its entirety.

BACKGROUND

1. Technical Field

The present disclosure relates to a motor control system, a motor control method, and a non-transitory storage medium.

2. Description of Related Art

Japanese Patent No. 5981219 describes a technology related to a braking device for a three-phase brushless motor.

SUMMARY

In an emergency etc., power supply to a braking device is occasionally cut off. In this case, switching elements included in an inverter circuit cannot be switched between an on state and an off state, and therefore it is difficult to apply short-circuit braking.

The present disclosure provides a motor control system, a motor control method, and a non-transitory storage medium that allow application of short-circuit braking to a motor while securing safety by not allowing drive of the motor.

A first aspect of the present disclosure provides a motor control system. The motor control system includes: an inverter circuit that includes switching elements; an inverter drive circuit configured to switch the switching elements between an on state and an off state; and a power source configured to supply power to the inverter drive circuit. The power source is switched from a first power source to a second power source that is different from the first power source when short-circuit braking is applied to a motor, the first power source being configured to supply power to the inverter circuit.

In the first aspect, power supply from the first power source to the inverter circuit and the inverter drive circuit may be cut off when short-circuit braking is applied to the motor.

In the first aspect, the motor control system may further include a control unit configured to apply short-circuit braking to the motor by transmitting a control signal to the inverter drive circuit.

In the first aspect, the second power source of the motor control system may be configured to supply power to the control unit.

In the first aspect, the motor control system may further include a machine learning model trained to determine whether a robot arm driven by the motor contacts or approaches a human or an object based on an image in which surroundings of the robot arm is captured or information from a contact sensor mounted on the robot arm. The power supply from the first power source to the inverter circuit and the inverter drive circuit may be cut off when a result of a determination made by the machine learning model is positive.

In the first aspect, the control unit may be configured to control a braking force due to short-circuit braking such that a counter-electromotive force generated between terminals of the motor becomes less than a predetermined value.

In the first aspect, the control unit may be configured to apply short-circuit braking to the motor when lowering an article grasped by a hand of a robot arm when a weight of the article is equal to or greater than a predetermined weight.

In the first aspect, the motor may be included in each of a plurality of joints of a robot arm; and the control unit may be configured to make a braking force due to short-circuit braking different among a plurality of motors.

In the first aspect, the motor may be included in a joint of a robot arm; and the control unit may be configured to change case of movement of the joint by applying short-circuit braking to the motor.

In the first aspect, the motor control system may further include: a cut-off portion configured to cut off power supply from the first power source to the inverter circuit; and a switching unit configured to switch which of a terminal of the cut-off portion on a side of the inverter circuit and a positive electrode of the second power source a power supply wire for the inverter drive circuit is electrically connected to. The power supply wire may be electrically connected to the terminal of the cut-off portion when the cut-off portion is in a connected state, and the power supply wire may be electrically connected to the positive electrode of the second power source when the cut-off portion is in a cut-off state.

Another aspect provides a motor control method, by a control unit, including switching a power source configured to supply power to an inverter drive circuit from a first power source to a second power source that is different from the first power source when short-circuit braking is applied to a motor, the inverter drive circuit being configured to switch switching elements between an on state and an off state, and the first power source being configured to supply power to an inverter circuit that includes the switching elements.

Another aspect provides a non-transitory storage medium that causes a computer to execute functions including switching a power source configured to supply power to an inverter drive circuit from a first power source to a second power source that is different from the first power source when short-circuit braking is applied to a motor, the inverter drive circuit being configured to switch switching elements between an on state and an off state, and the first power source being configured to supply power to an inverter circuit that includes the switching elements.

With the present disclosure, it is possible to provide a motor control system, a motor control method, and a non-transitory storage medium that allow application of short-circuit braking to a motor while securing safety by not allowing drive of the motor.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

While the present disclosure will be described below by way of embodiments, the disclosure according to the claims is not limited to the following embodiments.

Discussion Leading to Embodiments

Figure 1:
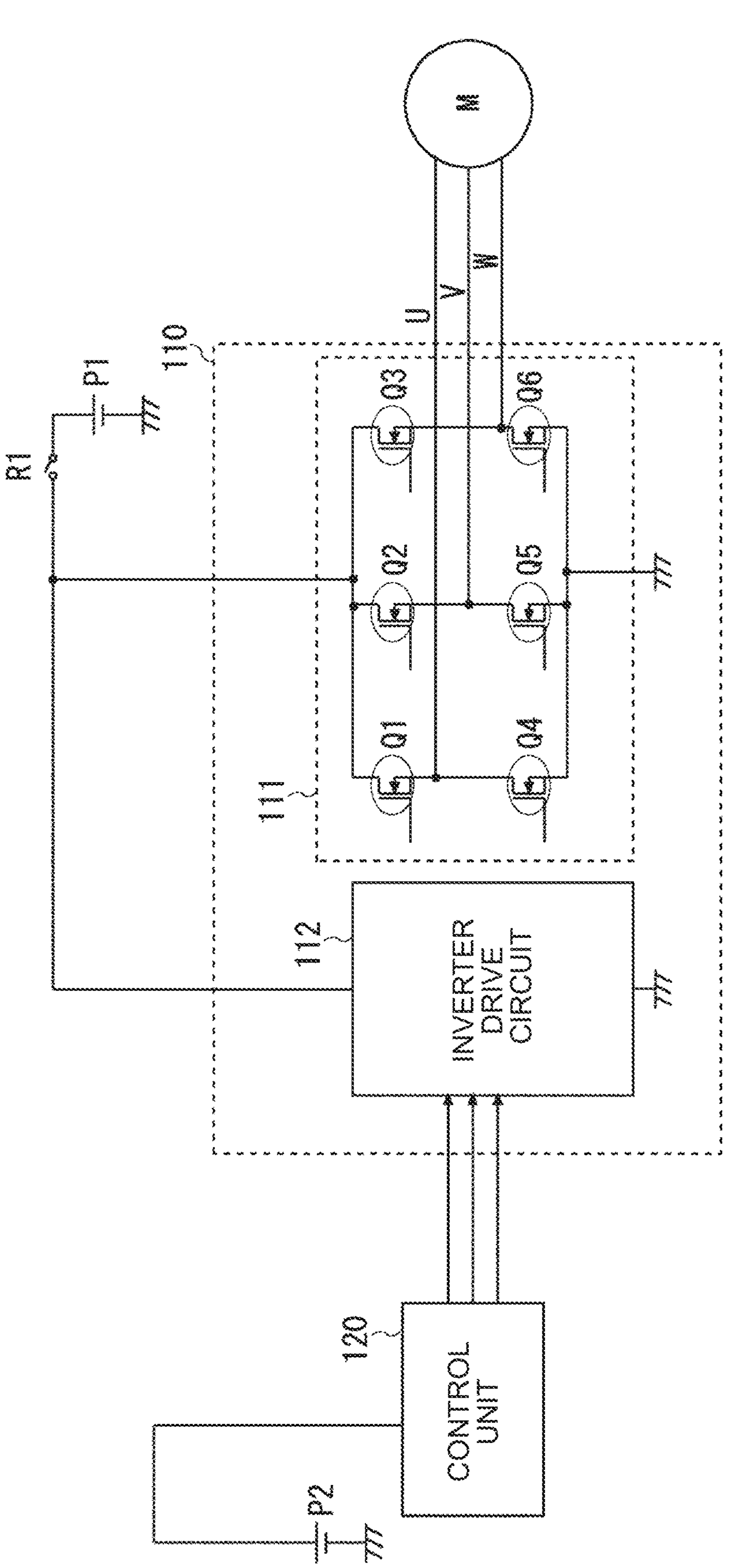
FIG. 1 illustrates the configuration of a motor control system according to a comparative example.

First, motor control systems according to comparative examples will be specifically described. FIG. 1 illustrates the configuration of a motor control system 50 according to a comparative example. In the following drawings, like elements are given like reference signs, and redundant description is omitted as necessary.

The motor control system 50 includes a motor M, a first power source P1, a cut-off portion R1, a drive circuit 110, a second power source P2, and a control unit 120. The first power source P1 is also referred to as a power-system power source. The second power source P2 is also referred to as a control-system power source. The motor M is a three-phase brushless motor or the like. The motor M includes a U-phase terminal, a V-phase terminal, and a W-phase terminal.

The first power source P1 supplies power to the drive circuit 110. The first power source P1 supplies power to both an inverter circuit 111 to be discussed later and an inverter drive circuit 112 to be discussed later. The first power source P1 may be a battery, or may be a power source provided via a power cord.

The cut-off portion R1 is configured to be able to cut off the supply of power from the first power source P1 to the drive circuit 110. The cut-off portion R1 may cut off the supply of power when a cut-off signal is received from the control unit 120 or an emergency stop button (not illustrated). One end of the cut-off portion R1 is electrically connected to a positive electrode of the first power source P1, and the other end of the cut-off portion R1 is electrically connected to a power supply wire for an inverter circuit 111 and an inverter drive circuit 112 to be discussed later. A step-down circuit may be disposed in a path between the cut-off portion R1 and the inverter drive circuit 112. The cut-off portion R1 may be an electromagnetic mechanical relay, for example. The cut-off portion R1 may be configured to be manually turned on and off by a human.

The drive circuit 110 drives the motor M. The drive circuit 110 includes an inverter circuit 111 and an inverter drive circuit 112.

The inverter circuit 111 includes a plurality of switching elements Q1 to Q6. The switching element Q1 is disposed in a path between the U-phase terminal of the motor M and the cut-off portion R1. The switching element Q2 is disposed in a path between the V-phase terminal of the motor M and the cut-off portion R1. The switching element Q3 is disposed in a path between the W-phase terminal of the motor M and the cut-off portion R1.

The switching element Q4 is disposed in a path between the U-phase terminal of the motor M and the ground. The switching element Q5 is disposed in a path between the V-phase terminal of the motor M and the ground. The switching element Q6 is disposed in a path between the W-phase terminal of the motor M and the ground. Although not illustrated, the gates of the switching elements Q1 to Q6 are electrically connected to the 20 inverter drive circuit 112.

The switching elements Q1 to Q6 may be metal oxide semiconductor field effect transistors (MOSFETs). The switching elements Q1 to Q6 may be insulated gate bipolar transistors (IGBTs) or thyristors.

The inverter drive circuit 112 drives the inverter circuit 111. That is, the inverter drive circuit 112 switches the switching elements Q1 to Q6 between the on state and the off state. The on state refers to a conductive state, and the off state refers to a cut-off state.

The second power source P2 supplies power to the control unit 120. The second power source P2 may be a battery, or may be a power source provided via a power cord.

The control unit 120 is composed of a microcomputer mainly composed of a central processing unit (CPU), a read only memory (ROM), and a random access memory (RAM). The control unit 120 inputs a pulse width modulation (PWM) signal to the inverter drive circuit 112. Rotation of the motor M is controlled by the inverter drive circuit 112 switching the switching elements Q1 to Q6 between the on state and the off state based on the PWM signal. Each function of the control unit 120 may be implemented by the CPU loading a computer program from the ROM to the RAM and executing the computer program.

The control unit 120 may include a function of transmitting a cut-off signal to the cut-off portion R1. For example, the control unit 120 may transmit a cut-off signal to the cut-off portion R1 when an emergency stop button (not illustrated) is pressed or when a human or an object approaches a machine driven by the motor M.

After the cut-off portion R1 cuts off the power supply from the first power source P1, the motor M keeps rotating because of an inertial force. When the switching elements Q4, Q5, and Q6 are brought into the on state, the U-phase terminal, the V-phase terminal, and the W-phase terminal of the motor M are short-circuited, and short-circuit braking is applied to the motor M. Since the power supply to the inverter drive circuit 112 is also cut off, however, the inverter drive circuit 112 cannot bring the switching elements Q4, Q5, and Q6 into the on state.

Figure 2:
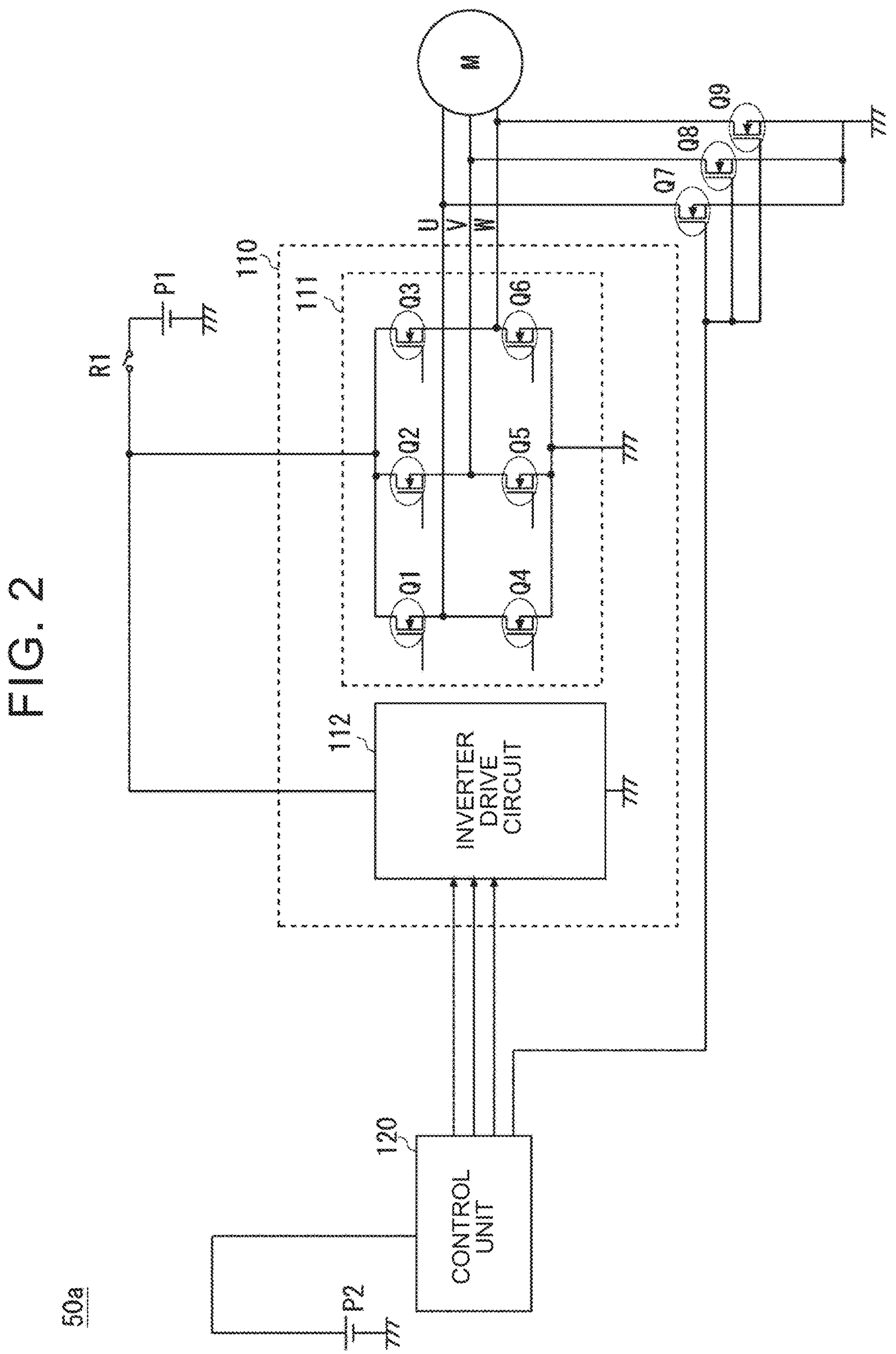
FIG. 2 illustrates the configuration of a motor control system according to a comparative example.

With reference to FIG. 2, the configuration of a motor control system 50*a* according to a modification is illustrated. When FIGS. 1 and 2 are compared, the motor control system 50*a* further includes switching elements Q7, Q8, and Q9. The switching element Q7 is disposed in a path between the U-phase terminal of the motor M and the ground. The switching element Q8 is disposed in a path between the V-phase terminal of the motor M and the ground. The switching element Q9 is disposed in a path between the W-phase terminal of the motor M and the ground. The gates of the switching elements Q7 to Q9 are electrically connected to the control unit 120.

When short-circuit braking is to be applied to the motor M, the control unit 120 brings the switching elements Q7, Q8, and Q9 into the on state. Short-circuit braking can be applied to the motor M by the control unit 120 bringing the switching elements Q7, Q8, and Q9 into the on state, even if the cut-off portion R1 is in the cut-off state.

The motor control system 50*a* can apply short-circuit braking to the motor M. However, the switching elements Q7 to Q9 are required, increasing the circuit area.

The present inventor has conceived of the present disclosure based on the above consideration.

First Embodiment

Figure 3:
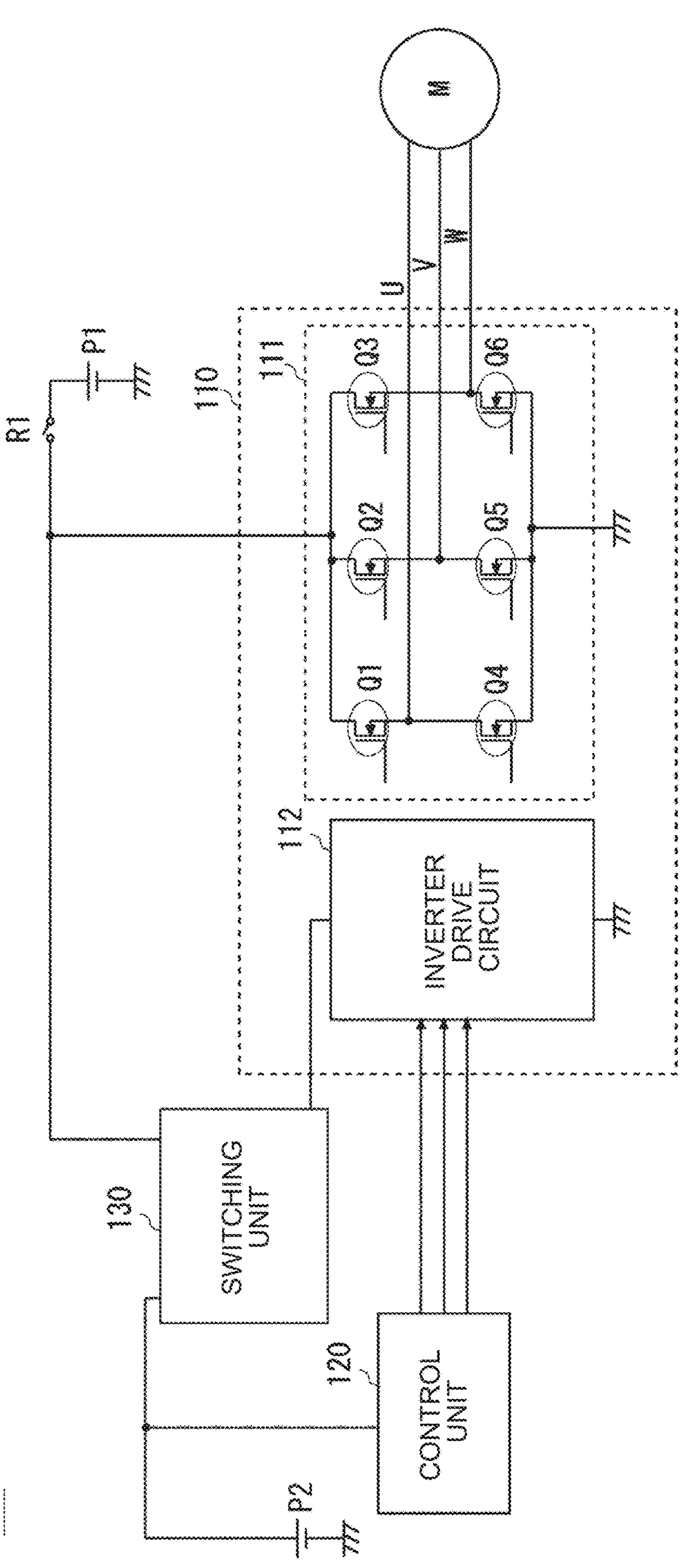
FIG. 3 illustrates the configuration of a motor control system according to a first embodiment.

A motor control system according to a first embodiment will be described below with reference to the drawings. FIG. 3 illustrates the configuration of a motor control system 100 according to the first embodiment. The motor control system 100 includes a motor M, a first power source P1, a cut-off portion R1, a drive circuit 110, a second power source P2, a control unit 120, and a switching unit 130. The drive circuit 110 includes an inverter circuit 111 and an inverter drive circuit 112.

The motor control system 100 controls a motor included in a joint of a robot arm, for example. In this case, a part of the motor control system 100 may be provided outside the robot arm. However, a system that includes only a single robot arm may also be included in the motor control system 100 according to the first embodiment.

When FIGS. 1 and 3 are compared, the motor control system 100 further includes the switching unit 130. In addition, the relationship of the electrical connection between the cut-off portion R1 and the drive circuit 110 is changed.

The cut-off portion R1 cuts off the power supply from the first power source P1 to the inverter circuit 111. A first terminal of the cut-off portion R1 is electrically connected to the positive electrode of the first power source P1, and a second terminal of the cut-off portion R1 is electrically connected to a power supply wire for the inverter circuit 111.

The switching unit 130 switches which of the second terminal of the cut-off portion R1 and the positive electrode of the second power source P2 the power supply wire for the inverter drive circuit 112 is electrically connected to. When the cut-off portion R1 is in the connected state, the power supply wire for the inverter drive circuit 112 is electrically connected to the second terminal of the cut-off portion R1. When the cut-off portion R1 is in the cut-off state, the power supply wire for the inverter drive circuit 112 is electrically connected to the positive electrode of the second power source P2. The switching unit 130 may switch the connection destination of the power supply wire for the inverter drive circuit 112 according to a switching signal received from the control unit 120. The connection destination of the power supply wire for the inverter drive circuit 112 may be automatically switched according to the cut-off portion R1 being cut off.

The voltage of the first power source P1 and the voltage of the second power source P2 may be different from each other. For example, the voltage of the first power source P1 is occasionally higher than the voltage of the second power source P2. In this case, the motor control system 100 may include a voltage boosting circuit that boosts the voltage of the second power source P2.

Figure 4:
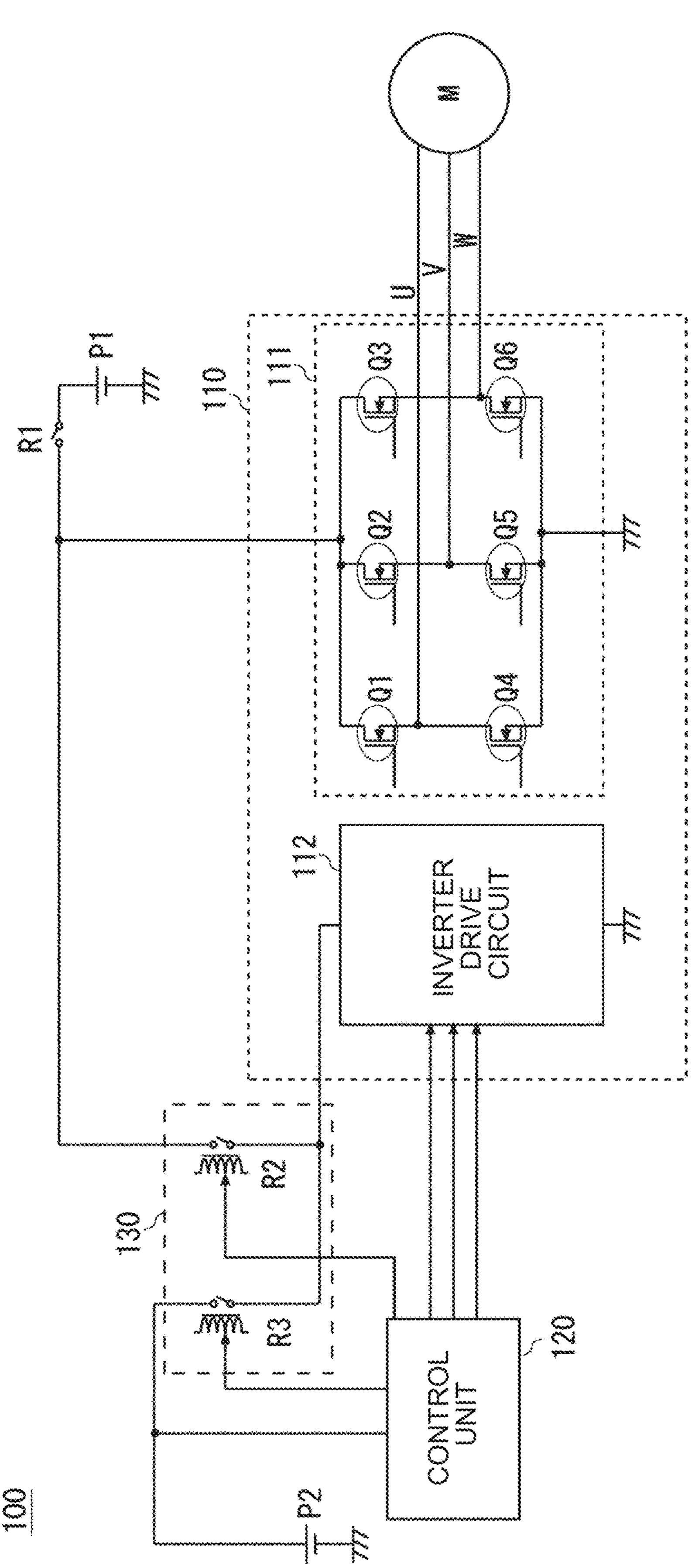
FIG. 4 illustrates an example of the configuration of a switching unit.

FIG. 4 illustrates a first example of the configuration of the switching unit 130. The switching unit 130 includes cut-off portions R2 and R3. The state of the cut-off portions R2 and R3 may be controlled by the control unit 120. The cut-off portions R2 and R3 are electromagnetic mechanical relays, for example. One end of the cut-off portion R2 is electrically connected to the second terminal of the cut-off portion R1. One end of the cut-off portion R3 is electrically connected to the positive electrode of the second power source P2. The other end of the cut-off portion R2 and the other end of the cut-off portion R3 are electrically connected to the power supply wire for the inverter drive circuit 112.

When the cut-off portion R1 is in the connected state, the cut-off portion R2 is brought into the connected state, and the cut-off portion R3 is brought into the cut-off state. When the cut-off portion R1 is in the cut-off state, the cut-off portion R2 is brought into the cut-off state, and the cut-off portion R3 is brought into the connected state. This allows switching of the connection destination of the power supply wire for the inverter drive circuit 112. The cut-off portions R2 and R3 are switched between the connected state and the cut-off state according to a switching signal from the control unit 120, for example. The control unit 120 may monitor the voltage of the path between the cut-off portion R1 and the cut-off portion R2, and bring the cut-off portion R2 into the cut-off state and bring the cut-off portion R3 into the connected state when the voltage is reduced, for example. Meanwhile, the control unit 120 may bring the cut-off portion R2 into the cut-off state and bring the cut-off portion R3 into the connected state when a signal indicating that the emergency stop button has been pressed is received.

Figure 5:
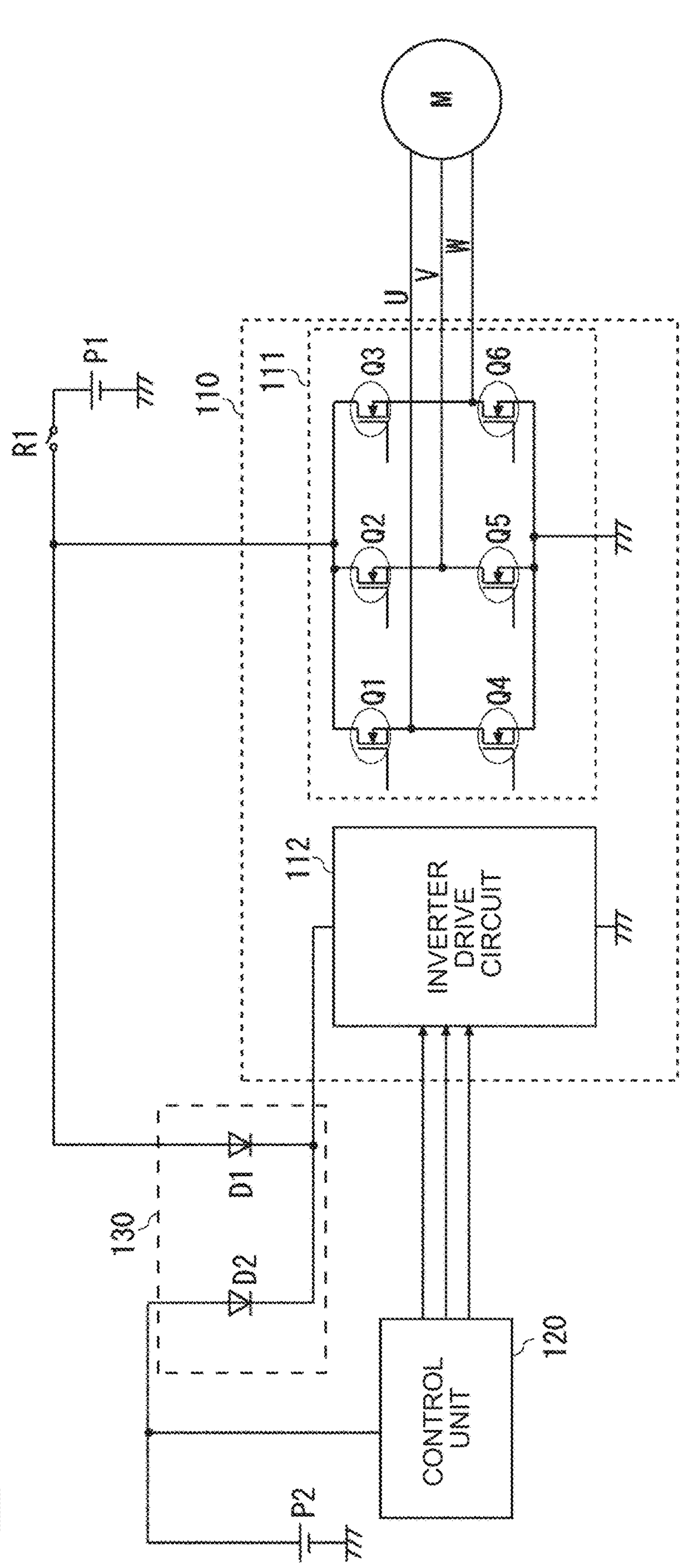
FIG. 5 illustrates an example of the configuration of the switching unit.

FIG. 5 illustrates a second example of the configuration of the switching unit 130. The cut-off portion R2 in FIG. 4 has been replaced with a diode D1, and the cut-off portion R3 in FIG. 4 has been replaced with a diode D2. It is assumed that the voltage of the first power source P1 is higher than the voltage of the second power source P2, for example. When the cut-off portion R1 is in the connected state, the voltage of the path between the cut-off portion R1 and the diode D1 is higher than the voltage of the path between the second power source P2 and the diode D2 (i.e., the voltage of the second power source P2). Thus, the diode D1 is brought into the conductive state, and the diode D2 is brought into the non-conductive state. When the cut-off portion R1 is in the cut-off state, the voltage of the path between the cut-off portion R1 and the diode D1 is lower than the voltage of the path between the second power source P2 and the diode D2 (i.e., the voltage of the second power source P2). Thus, the diode D1 is brought into the non-conductive state, and the diode D2 is brought into the conductive state. It is not necessary for the control unit 120 to transmit a control signal to the switching unit 130.

The configuration of the switching unit 130 is not limited to the example illustrated in FIG. 4 or the example illustrated in FIG. 5. For example, the switching unit 130 may be constituted by a single changeover switch.

The control unit 120 includes a function of controlling rotation of the motor M by transmitting a control signal to the inverter drive circuit 112. In particular, the control unit 120 includes a function of applying short-circuit braking to the motor M. When the control unit 120 applies short-circuit braking to the motor M, the power source for the inverter drive circuit 112 is switched from the first power source P1 to the second power source P2. When short-circuit braking is applied to the motor M, the cut-off portion R1 is in the cut-off state, and the power supply from the first power source P1 to the inverter circuit 111 and the inverter drive circuit 112 is cut off.

The timing when the motor control system 100 applies short-circuit braking is not limited to the timing when the motor M is subjected to an emergency stop. For example, short-circuit braking may be applied to the motor M when a braking force is applied to rotation of a shoulder joint or an elbow joint due to gravity or when a mechanical impedance (case of movement of each joint) of a robot arm is controlled.

The control unit 120 may further include a function of switching the connection destination of the power supply wire for the inverter drive circuit 112 by transmitting a switching signal to the switching unit 130. The control unit 120 switches the connection destination of the power supply wire for the inverter drive circuit 112 to the second power source P2 when the cut-off portion R1 is cut off. The control unit 120 may switch the connection destination of the power supply wire for the inverter drive circuit 112 when a signal indicating that the emergency stop button has been pressed is received, for example. The control unit 120 may also monitor the voltage of the path between the second terminal of the cut-off portion R1 and the switching unit 130, and switch the connection destination of the power supply wire for the inverter drive circuit 112 when the voltage is reduced.

The control unit 120 may further include a function of transmitting a cut-off signal to the cut-off portion R1. The control unit 120 transmits a cut-off signal to the cut-off portion R1 when a human or an object contacts or approaches a machine (e.g., a robot arm) driven by the motor M, for example. The control unit 120 may transmit a switching signal to the switching unit 130 when a cut-off signal is transmitted to the cut-off portion R1.

When a contact sensor is provided on a surface of the robot arm, for example, the control unit 120 may transmit a cut-off signal to the cut-off portion R1 when an output of the contact sensor exceeds a threshold. The control unit 120 may also store a machine learning model trained to determine whether the robot arm has approached a human or an object based on an image in which the surroundings of the robot arm are captured or information from the contact sensor mounted on the robot arm. In this case, the control unit 120 may transmit a cut-off signal to the cut-off portion R1 when the result of a determination made by the machine learning model is positive. The control unit 120 may also transmit a cut-off signal to the cut-off portion R1 at any timing when short-circuit braking is applied to the motor M.

When the cut-off portion R1 is cut off and the connection destination of the power supply wire for the inverter drive circuit 112 is switched, the control unit 120 applies short-circuit braking to the motor M. Since the power supply wire for the inverter drive circuit 112 is electrically connected to a power source (second power source P2), the inverter drive circuit 112 is operable, and the control unit 120 can apply short-circuit braking to the motor M. Since the inverter circuit 111 is not electrically connected to any power source, it is ensured that the motor M is not driven.

The control unit 120 may control the braking force due to short-circuit braking based on the duty ratio of the PWM signal. The control unit 120 may control the braking force due to short-circuit braking based on the duty ratio that indicates the proportion of the time for which the switching elements Q are turned on.

When short-circuit braking is applied to the motor M, a counter-electromotive force is generated between the U-phase, V-phase, and W-phase terminals of the motor. There is a possibility that a dielectric breakdown is caused on a substrate on which the drive circuit 110 is mounted when a counter-electromotive force of a predetermined value or more is generated. The counter-electromotive force generated between the terminals of the motor M is varied according to the magnitude of the braking force due to short-circuit braking. For example, the counter-electromotive force generated between the terminals of the motor M is larger as the braking force due to short-circuit braking is larger. Thus, the control unit 120 may control the braking force due to short-circuit braking such that the generated counter-electromotive force is less than the predetermined value. This suppresses the occurrence of a dielectric breakdown due to the counter-electromotive force. The control unit 120 may determine the magnitude of the braking force based on the present rotational speed of the motor.

The second power source P2 is not limited to a power source that supplies power to the control unit 120. It is only necessary that the second power source P2 should be a power source that is different from the first power source P1. However, it is advantageously not necessary to prepare a different power source (e.g., a battery) when the second power source P2 is a power source that supplies power to the control unit 120.

The motor control system according to the first embodiment can apply short-circuit braking to the motor while it is ensured that the motor is not driven. It is not necessary to prepare switching elements exclusively for short-circuit braking, suppressing an increase in the area of the drive circuit.

Second Embodiment

Figure 6:
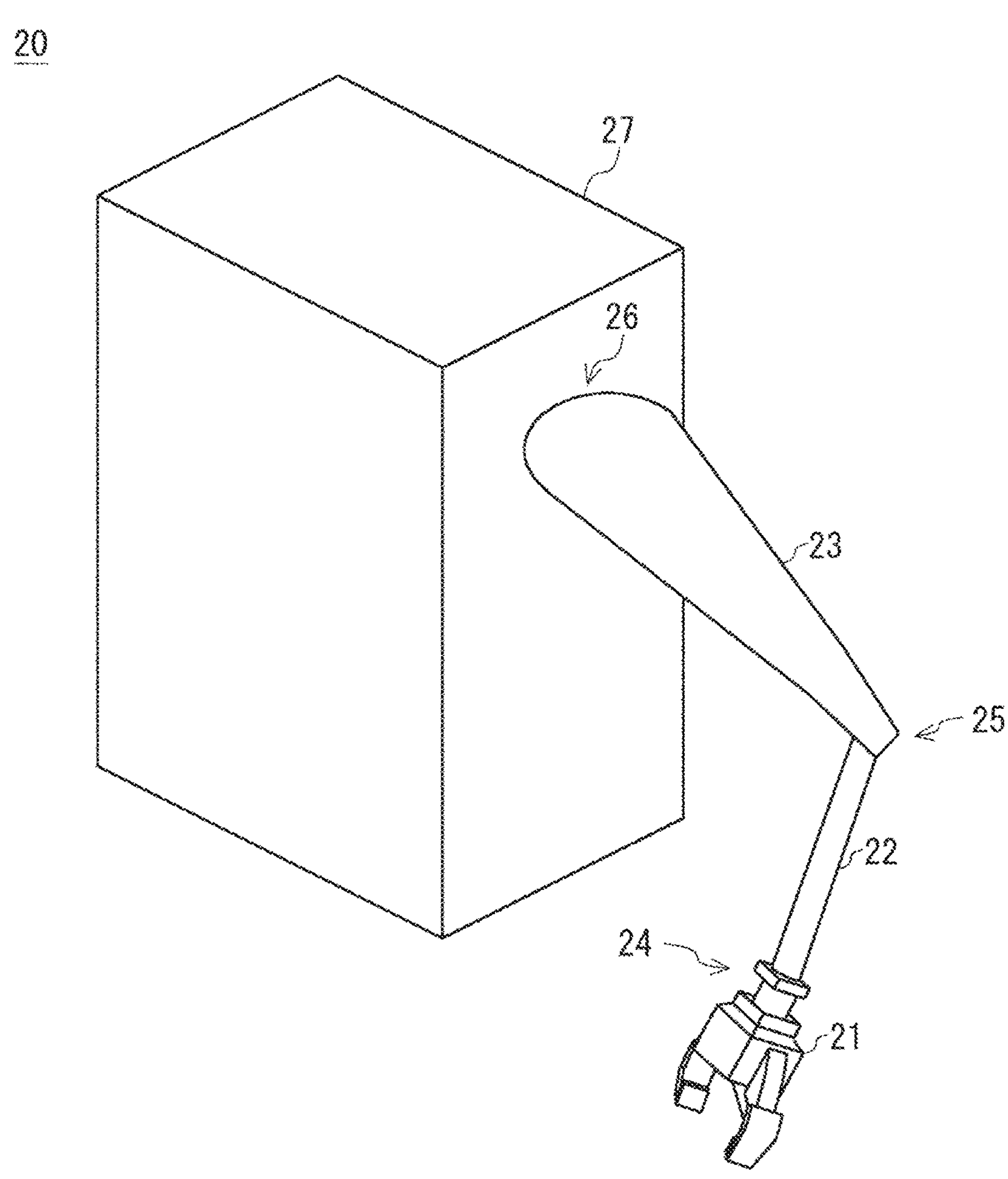
FIG. 6 illustrates the configuration of a robot arm according to a second embodiment.

A second embodiment is a specific example of the first embodiment. The second embodiment includes a robot arm driven by a motor. FIG. 6 illustrates the configuration of a robot arm 20 of a motor control system according to the second embodiment. The robot arm 20 includes a hand 21, a first link 22, a second link 23, a wrist joint 24, an elbow joint 25, a shoulder joint 26, and a body 27.

The hand 21 grasps an article. One end of the first link 22 is rotatably coupled to the hand 21 via the wrist joint 24. One end of the second link 23 is rotatably coupled to the other end of the first link 22 via the elbow joint 25. The shoulder joint 26 is rotatably coupled to the other end of the second link 23. The shoulder joint 26 is coupled to the body 27. The body 27 may be configured as desired, and may be provided with a head portion and a leg portion. FIG. 6 illustrates the body 27 with a simplified configuration. The described configuration of the robot arm 20 is exemplary. The configuration of the robot arm 20 is not limited thereto, and the number of links and joints may be different, for example.

A motor (not illustrated) is built in each of the wrist joint 24, the elbow joint 25, and the shoulder joint 26. A rotation sensor (e.g., a rotary encoder) (not illustrated) may be further provided in each of the wrist joint 24, the elbow joint 25, and the shoulder joint 26. The rotation sensor outputs information that indicates a rotational angle to a control unit to be discussed later. The control unit may be provided in the body 27. The motor rotationally drives the wrist joint 24, the elbow joint 25, and the shoulder joint 26 according to a control signal from the control unit, and controls the posture of the robot arm 20.

When an article etc. grasped by the hand 21 is to be lowered, the control unit may apply an appropriate braking force to rotation of the shoulder joint 26 and the elbow joint 25 due to gravity by applying short-circuit braking to the motors. In addition, the control unit can change the mechanical impedance of each joint (case of movement of each joint) of the robot arm 20 by applying short-circuit braking. The cooperation of the robot arm 20 with humans can be improved by controlling the mechanical impedance.

In addition, the control unit may apply short-circuit braking to the motors when the robot arm 20 is subjected to an emergency stop. The speed of rotation of each joint due to gravity can be reduced by applying short-circuit braking to the motors.

Figure 7:
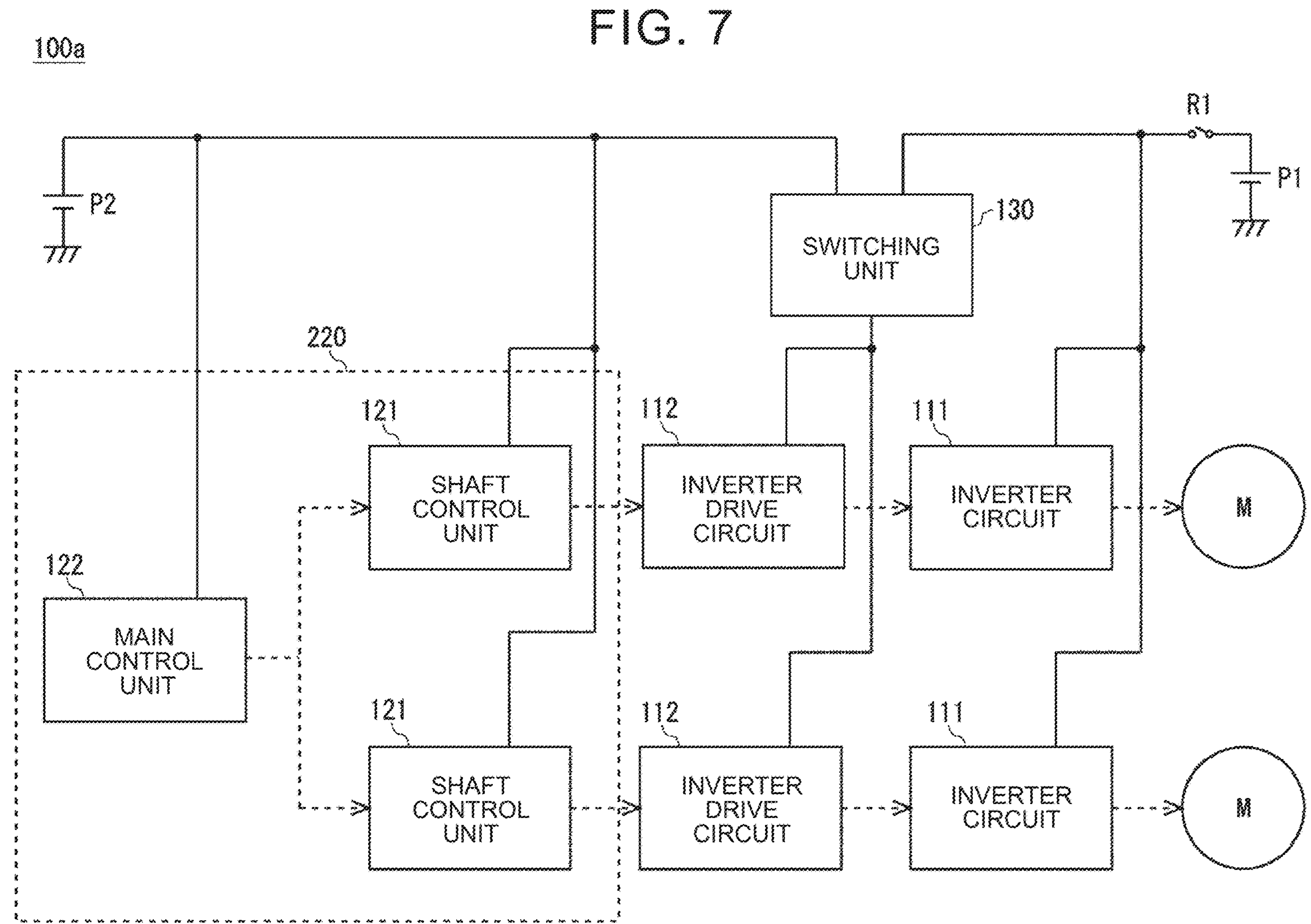
FIG. 7 illustrates the configuration of a motor control system according to the second embodiment.

FIG. 7 illustrates an example of the configuration of a motor control system 100*a* according to the second embodiment. In FIG. 7, the main flow of control is indicated by dotted arrows.

The motor control system 100*a* includes a plurality of motors M, a plurality of inverter circuits 111, a plurality of inverter drive circuits 112, and a control unit 220. The control unit 220 corresponds to the control unit 120 discussed above. The control unit 220 includes a plurality of shaft control units 121 and a main control unit 122.

The motors M are included in the plurality of joints. The inverter circuit 111, the inverter drive circuit 112, and the shaft control unit 121 are provided for each of the motors M. The shaft control unit 121 controls drive of the motor M by transmitting a control signal to the inverter drive circuit 112.

The main control unit 122 controls operation of the entire robot arm 20. The main control unit 122 is a CPU at a higher level than CPUs that constitute the shaft control units 121.

The motor control system 100*a* includes a first power source P1, a second power source P2, a cut-off portion R1, and a switching unit 130 as in the first embodiment. The main control unit 122 is supplied with power from the second power source P2. The switching unit 130 switches the connection destination of the power supply wire for the inverter drive circuit 112.

When short-circuit braking is to be applied to the motors M, the control unit 220 transmits a cut-off signal to the cut-off portion R1, and transmits a switching signal to the switching unit 130, for example. Short-circuit braking is applied when the mechanical impedance of each joint of the robot arm 20 is increased, for example. The control unit 220 may determine whether to apply short-circuit braking based on an image in which the surroundings of the robot arm 20 are captured or an output of the contact sensor provided on a surface of the robot arm 20.

The control unit 220 may change the case of movement of each joint by applying short-circuit braking to the motor M. The case of movement of each joint can be changed with less energy loss by using short-circuit braking.

The control unit 220 may determine whether to apply short-circuit braking to the motor M when an article grasped by the hand of the robot arm 20 is to be lowered. The control unit 220 may apply short-circuit braking to the motor M when the article grasped by the hand of the robot arm 20 has a predetermined weight or more, for example. The control unit 220 may also apply short-circuit braking to the motor M when there is a human or an object present around the robot arm 20. The control unit 220 can reduce the operation speed of the robot arm 20 when it is highly necessary to secure safety.

The control unit 220 can vary the braking force by appropriately setting the duty ratio. The control unit 220 may increase the braking force by setting the duty ratio to be higher as the weight of the article grasped by the hand of the robot arm 20 is greater, for example. The braking force may also be increased by setting the duty ratio to be higher as there are more objects present around the robot arm 20. This optimizes the operation speed of the robot arm 20.

The braking force to be applied to the motor M may be different among the joints. For example, the control unit 220 may apply different braking forces to the motor M included in the shoulder joint and the motor M included in the elbow joint. The control unit 220 may optimize the braking force to be applied to the motors M when there is a human present around the robot arm.

Figure 8:
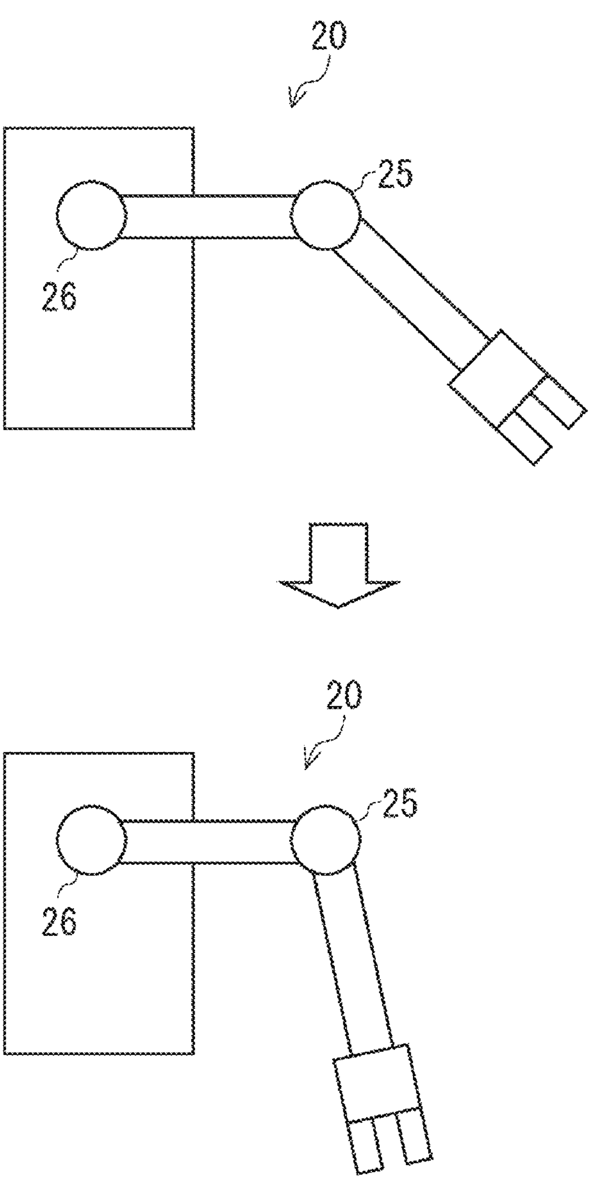
FIG. 8 illustrates an example of operation of the robot arm according to the second embodiment.

It is assumed that the robot arm 20 is in the posture illustrated in the upper part of FIG. 8, in which both the elbow joint 25 and the shoulder joint 26 are rotatable by gravity. The control unit 220 increases the braking force to be applied to the motor of the shoulder joint 26, and reduces the braking force to be applied to the motor of the elbow joint 25, for example. In this case, the elbow joint 25 is mainly rotated, and the posture of the robot arm 20 is varied to the posture illustrated in the lower part of FIG. 8. The control unit 220 can vary the posture of the robot arm 20 by appropriately determining the braking forces to be applied to the motors.

The process of determining the braking forces to be applied to the motors may be performed by the main control unit 122 as a higher-level CPU. The moment of inertia around each axis is varied by the weight of the article grasped by the hand. An appropriate braking force can be applied to each axis by providing a braking instruction from the main control unit 122 that grasps the state of all the axes to the shaft control units 121.

The main control unit 122 can determine the braking force based on the present posture of the robot arm. The main control unit 122 determines the allowable magnitude of the braking force based on the present posture. The braking force may be determined based on the relationship among the external force and the braking force applied to the motor and the counter-electromotive force generated between the terminals of the motor. The duty ratio is determined according to the braking force.

The motor control system 100*a* according to the second embodiment can apply short-circuit braking to the motors included in the joints while securing safety by not allowing drive of the joints of the robot arm. It is also possible to improve safety by performing impedance control for the joints through short-circuit braking, and to improve cooperation of the robot with humans.

In the example discussed above, the program includes a group of instructions (or software codes) for causing a computer to perform one or more of the functions described in relation to the embodiments when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present disclosure is not limited to the above embodiments, and can be modified as appropriate without departing from the spirit and scope of the present disclosure.

What is claimed is:

1. A motor control system comprising:

an inverter circuit that includes switching elements;

an inverter drive circuit configured to switch the switching elements between an on state and an off state;

a power source configured to supply power to the inverter drive circuit; and a machine learning model trained to determine whether a robot arm driven by a motor contacts or approaches a human or an object based on an image in which surroundings of the robot arm is captured or information from a contact sensor mounted on the robot arm, wherein the power source is switched from a first power source to a second power source that is different from the first power source when short-circuit braking is applied to the motor, the first power source being configured to supply power to the inverter circuit, power supply from the first power source to the inverter circuit and the inverter drive circuit is cut off when short-circuit braking is applied to the motor, and the power supply from the first power source to the inverter circuit and the inverter drive circuit is cut off when a result of a determination made by the machine learning model is positive.

2. The motor control system according to claim 1, further comprising a control unit configured to apply short-circuit braking to the motor by transmitting a control signal to the inverter drive circuit.

3. The motor control system according to claim 2, wherein the second power source is configured to supply power to the control unit.

4. The motor control system according to claim 2, wherein the control unit is configured to control a braking force due to short-circuit braking such that a counter-electromotive force generated between terminals of the motor becomes less than a predetermined value.

5. The motor control system according to claim 2, wherein the control unit is configured to apply short-circuit braking to the motor when lowering an article grasped by a hand of the robot arm driven by the motor when a weight of the article is equal to or greater than a predetermined weight.

6. The motor control system according to claim 2, wherein:

the motor is included in each of a plurality of joints of the robot arm; and the control unit is configured to make a braking force due to short-circuit braking different among a plurality of motors.

7. The motor control system according to claim 2, wherein:

the motor is included in a joint of the robot arm; and the control unit is configured to change ease of movement of the joint by applying short-circuit braking to the motor.

8. The motor control system according to claim 1, further comprising:

a cut-off portion configured to cut off power supply from the first power source to the inverter circuit; and a switching unit configured to switch which one of (i) a terminal of the cut-off portion on a side of the inverter circuit and (ii) a positive electrode of the second power source is electrically connected to a power supply wire for the inverter drive circuit, wherein:

the power supply wire is electrically connected to the terminal of the cut-off portion when the cut-off portion is in a connected state; and the power supply wire is electrically connected to the positive electrode of the second power source when the cut-off portion is in a cut-off state.

9. A motor control method comprising switching, by a control unit, a power source configured to supply power to an inverter drive circuit from a first power source to a second power source that is different from the first power source when short-circuit braking is applied to a motor, wherein the inverter drive circuit being configured to switch switching elements between an on state and an off state, and the first power source being configured to supply power to an inverter circuit that includes the switching elements, cutting off power supply from the first power source to the inverter circuit and the inverter drive circuit when short-circuit braking is applied to the motor, determining, by a machine learning model stored in the control unit, whether a robot arm driven by the motor contacts or approaches a human or an object based on a captured image of surroundings of the robot arm or information from a contact sensor mounted on the robot arm, and cutting off the power supply from the first power source to the inverter circuit and the Inverter drive circuit when a result of a determination made by the machine learning model is positive.

10. A non-transitory storage medium that stores instructions that are executable by one or more processors of a computer and that cause the one or more processors to execute functions comprising switching a power source configured to supply power to an inverter drive circuit from a first power source to a second power source that is different from the first power source when short-circuit braking is applied to a motor, wherein the inverter drive circuit being configured to switch switching elements between an on state and an off state, and the first power source being configured to supply power to an inverter circuit that includes the switching elements cutting off power supply from the first power source to the inverter circuit and the inverter drive circuit when short-circuit braking is applied to the motor, determining whether a robot am driven by the motor contacts or approaches a human or an object based on a captured image of surroundings of the robot arm or information from a contact sensor mounted on the robot arm, cutting off the power supply from the first power source to the inverter circuit and the inverter drive circuit when a result of a determination is positive.

* * * * *